United States Patent
Willey (10) Patent No.: US 11,698,115 B2
(45) Date of Patent: Jul. 11, 2023

(54) SLIDING MECHANISM FOR GUIDE PINS OF A DISC BRAKE ASSEMBLY

(71) Applicant: ZF Active Safety US Inc., Livonia, MI (US)

(72) Inventor: Joseph Willey, Canton, MI (US)

(73) Assignee: ZF Active Safety US Inc., Livonia, MI (US)

(*) Notice: Subject to any disclaimer, the term of this patent is extended or adjusted under 35 U.S.C. 154(b) by 83 days.

(21) Appl. No.: 16/785,091

(22) Filed: Feb. 7, 2020

(65) Prior Publication Data

US 2020/0256410 A1 Aug. 13, 2020

Related U.S. Application Data

(60) Provisional application No. 62/804,387, filed on Feb. 12, 2019.

(51) Int. Cl.
*F16D 65/00* (2006.01)
*F16D 55/2265* (2006.01)
*F16D 55/00* (2006.01)

(52) U.S. Cl.
CPC ... *F16D 65/0006* (2013.01); *F16D 55/22655* (2013.01); *F16D 65/0056* (2013.01); *F16D 65/0087* (2013.01); *F16D 2055/007* (2013.01); *F16D 2055/0008* (2013.01); *F16D 2055/0041* (2013.01)

(58) Field of Classification Search
CPC ....... F16D 55/22655; F16D 2055/0008; F16D 2055/0016; F16D 55/226; F16D 65/0056; F16D 65/0068; F16D 2055/007; F16D 55/2265; F16D 65/0087; F16D 65/02; F16D 65/0006; F16D 55/22265; F16D 2055/0041
See application file for complete search history.

(56) References Cited

U.S. PATENT DOCUMENTS

| | | | | |
|---|---|---|---|---|
| 3,388,774 A | * | 6/1968 | Burnett | F16D 55/227 188/73.35 |
| 3,688,876 A | * | 9/1972 | Hirai | F16D 55/22655 188/71.8 |
| 3,881,576 A | * | 5/1975 | Haraikawa | F16D 65/54 188/73.35 |
| 4,106,595 A | * | 8/1978 | Kimura | F16D 55/227 188/73.39 |
| 4,162,721 A | * | 7/1979 | Moriya | F16D 55/22655 188/73.1 |

(Continued)

FOREIGN PATENT DOCUMENTS

| | | | | |
|---|---|---|---|---|
| GB | 1382046 A | * | 1/1975 | ....... F16D 55/22655 |
| KR | 20010062993 A | * | 7/2001 | |

*Primary Examiner* — Bradley T King
*Assistant Examiner* — Mahbubur Rashid
(74) *Attorney, Agent, or Firm* — Robert James Harwood (57) ABSTRACT

A disc brake assembly includes an anchor bracket, a guide pin, a sliding mechanism, and a damping member. The anchor bracket may have at least one bore formed therein. The guide pin may be adapted to be disposed in the at least one bore and slidably support a brake caliper relative to the anchor bracket. The sliding mechanism may be adapted to be disposed in the at least one bore and to slidably support the guide pin in the at least one bore. The damping member may damp sliding motion of the guide pin relative to the anchor bracket.

16 Claims, 7 Drawing Sheets

(56) References Cited

U.S. PATENT DOCUMENTS

| | | | | |
|---|---|---|---|---|
| 4,279,331 A * | 7/1981 | Lupertz | F16D 55/22655 | 188/71.8 |
| 4,630,713 A * | 12/1986 | Carre | F16D 65/0975 | 188/73.44 |
| 4,685,542 A * | 8/1987 | Colpaert | F16D 55/2262 | 188/196 P |
| 4,709,789 A * | 12/1987 | Czich | F16D 55/22655 | 188/73.44 |
| 5,158,373 A * | 10/1992 | Hanaway | F16C 29/04 | 384/30 |
| 5,217,093 A * | 6/1993 | Carpenter | F16D 55/22655 | 188/73.35 |
| 5,226,510 A * | 7/1993 | Le Deit | F16D 55/227 | 188/73.34 |
| 5,593,006 A * | 1/1997 | Le Deit | F16D 55/22655 | 188/73.37 |
| 6,026,938 A * | 2/2000 | Demoise, Jr. | F16D 55/22655 | 188/73.35 |
| 8,220,596 B2 * | 7/2012 | Fischer | F16D 55/22655 | 188/73.44 |
| 9,181,998 B2 * | 11/2015 | Isono | F16D 65/0068 | |
| 9,291,216 B2 * | 3/2016 | Nakano | F16D 27/112 | |
| 9,816,577 B2 * | 11/2017 | Fischer | F16D 55/22655 | |
| 9,850,967 B2 * | 12/2017 | Gerber | F16D 55/22655 | |
| 10,221,904 B2 * | 3/2019 | Knoop | F16D 65/0087 | |
| 2006/0283671 A1 * | 12/2006 | Mackiewicz | F16D 65/095 | 188/73.47 |
| 2008/0029356 A1 * | 2/2008 | Halasy-Wimmer | F16D 55/22655 | 188/73.45 |
| 2010/0282547 A1 * | 11/2010 | Fischer | F16F 1/3835 | 188/71.1 |
| 2011/0284332 A1 * | 11/2011 | Champion | F16D 55/22655 | 384/26 |
| 2018/0142742 A1 * | 5/2018 | Kula | F16D 55/22655 | |

* cited by examiner

SLIDING MECHANISM FOR GUIDE PINS OF A DISC BRAKE ASSEMBLY

CROSS-REFERENCE TO RELATED APPLICATIONS

This application claims priority to U.S. Provisional Patent Application No. 62/804,387, filed Feb. 12, 2019, the present disclosure of which is incorporated herein by reference in its entirety.

BACKGROUND OF INVENTION

This invention relates in general to vehicle disc brake assemblies and in particular to a sliding mechanism for use with guide pins of a disc brake assembly.

Most vehicles are equipped with a brake system for slowing or stopping movement of the vehicle in a controlled manner A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators thereof, are well known in the art.

A typical disc brake assembly includes a brake disc, a brake caliper, and an anchor bracket. The brake disc is fixed to a wheel of the vehicle for rotation therewith. Guide pins are fixed to the brake caliper. The guide pins extend into bores in the anchor bracket. Thus, the brake caliper is slidably supported on the guide pins relative to the anchor bracket. The anchor bracket, in turn, is fixed to a non-rotatable component of the vehicle. The brake caliper includes a pair of brake pads which are disposed on opposite sides of the brake disc. One or more hydraulically or pneumatically actuated pistons move the brake pads between a non-braking position and a braking position. In the braking position, the brake pads are moved into frictional engagement with the opposed braking surfaces of the brake disc. For example, when an operator of the vehicle depresses the brake pedal, the piston urges the brake pads from the non-braking position to the braking position so as to frictionally engage the opposed braking surfaces of the brake disc and produce a braking torque. The braking torque slows or stops rotation of the associated wheel of the vehicle.

The braking torque is carried from the brake caliper to the anchor bracket by brake pads abutting against the anchor bracket. However, as the braking torque increases, and therefore anchor bracket deflection, the guide pins may bind against the anchor bracket in the bores and reduce an ability of the brake caliper to maintain or produce equal pressure on each of the brake pads. This can lead to uneven wear of the brake disc and the brake pads, and produce undesirable effects related noise, vibration and harshness perceived by the operator of the vehicle. Furthermore, there is a clearance between the guide pins and the bores in the anchor bracket for movement of the brake caliper relative to the anchor bracket. However, the clearance may also cause undesirable rattling or other noise, vibration, and harshness from the guide pins striking inner surfaces of the bores. Wrapping— i.e., tilting or other misalignment—of the brake caliper may occur because of the clearance between the guide pins and the bores and also lead to uneven brake pad wear. Thus, it would be desirable to provide a brake caliper that eliminates or substantially reduces binding, rattle, and wrapping for the disc brake assembly.

SUMMARY

According to one aspect of the invention, a disc brake assembly comprises an anchor bracket having at least one bore formed therein, a guide pin adapted to be disposed in the at least one bore and slidably support a brake caliper relative to the anchor bracket, a sliding mechanism adapted to be disposed in the at least one bore and to slidably support the guide pin in the at least one bore, and a damping member damping sliding motion of the guide pin relative to the anchor bracket.

According to another aspect of the invention, the sliding mechanism is disposed in the at least one bore between the anchor bracket and the guide pin.

According to another aspect of the invention, the sliding mechanism includes bearing members.

According to another aspect of the invention, the bearing members are carried by a tubular sleeve.

According to another aspect of the invention, the bearing members are ball bearings.

According to another aspect of the invention, the damping member is an elastomer material.

According to another aspect of the invention, the guide pin has a circumferential recess and the damping member is an elastomer O-ring in the recess.

According to another aspect of the invention, the damping member is adapted to retain the guide pin in the sliding mechanism.

According to another aspect of the invention, both the guide pin and the sliding mechanism are adapted to allow the sliding motion.

According to another aspect of the invention, the disc brake assembly further comprises a step in the at least one bore. The step limits sliding motion of the sliding mechanism.

According to another aspect of the invention, the disc brake assembly further comprises a step in the guide pin. The step limits sliding motion of the sliding mechanism.

An advantage of an embodiment is a disc brake assembly with a sliding mechanism that eliminates or substantially reduces binding, rattle, and wrapping for the disc brake assembly. Other advantages of this invention will become apparent to those skilled in the art from the following detailed description of the preferred embodiments, when read in light of the accompanying drawings.

DETAILED DESCRIPTION

Figure 1:
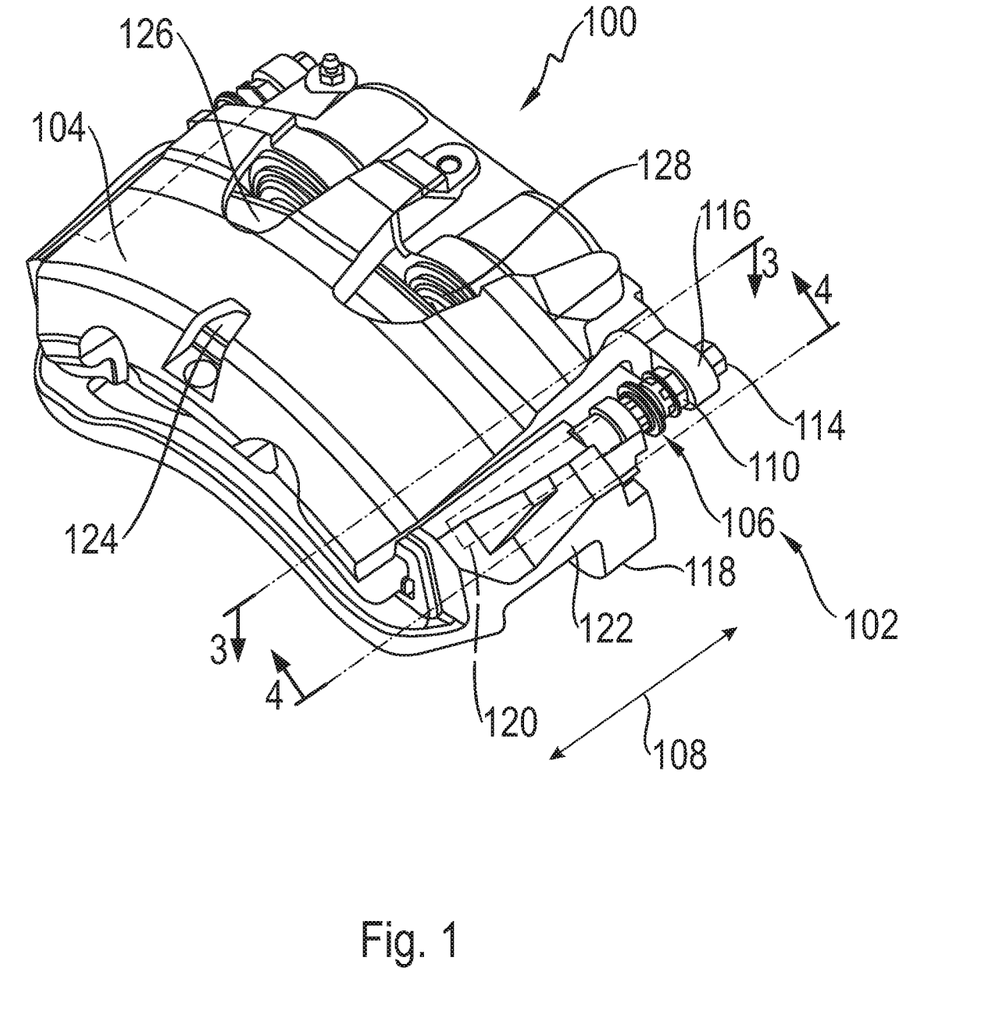
FIG. 1 is a perspective view of a disc brake assembly having a sliding mechanism in accordance with a first embodiment of the present invention.
Figure 2:
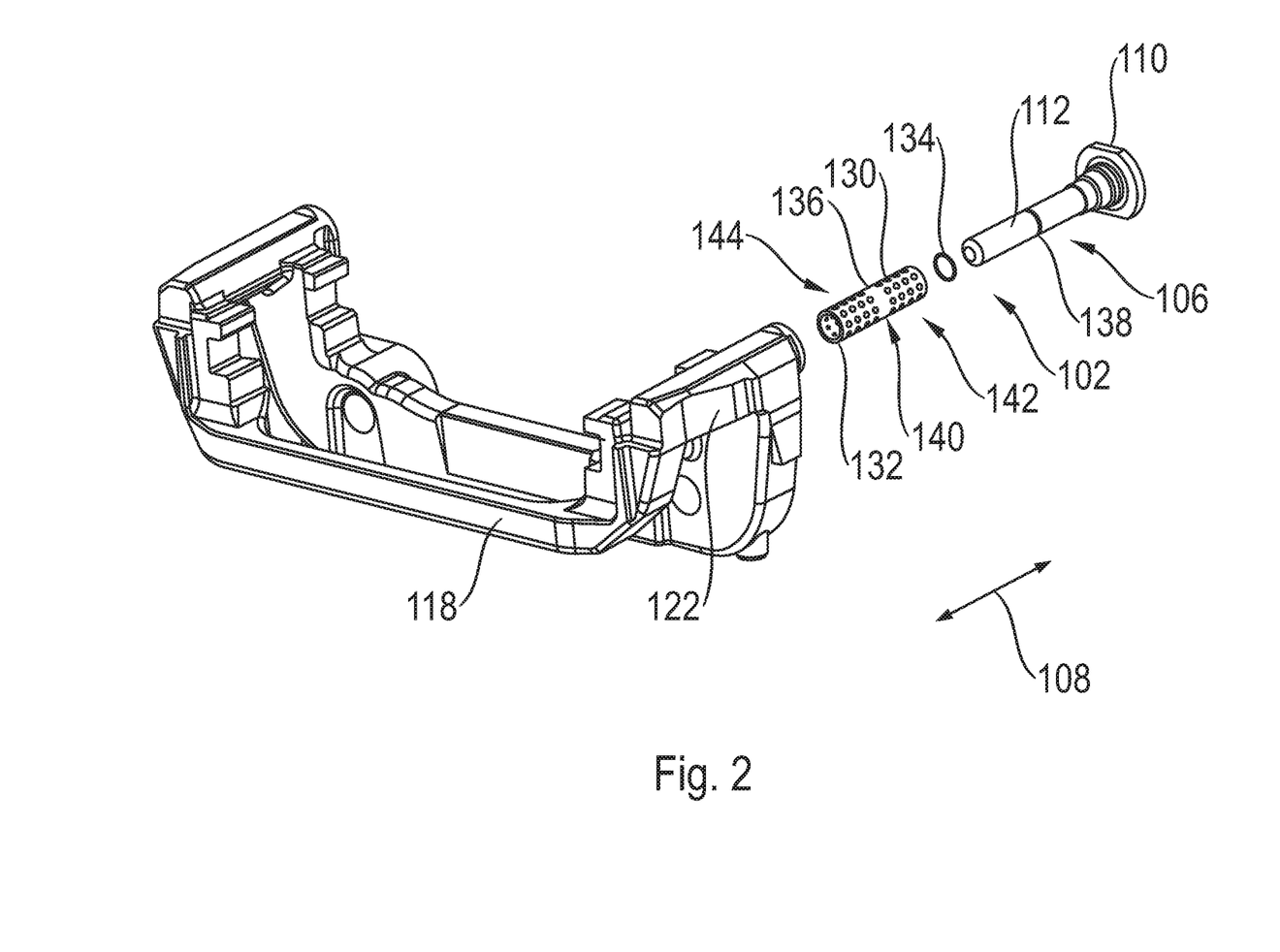
FIG. 2 is an exploded perspective view of a portion of the disc brake assembly of FIG. 1.

Referring now to FIG. 1, there is illustrated a disc brake assembly, indicated generally at 100, having a sliding mechanism, indicated generally at 102 (no 102 shown in FIG. 1) and shown in FIG. 2, in accordance with a first embodiment of the present invention. The disc brake assembly 100 is a "pin guided" or "pin sliding" type of which the general structure and operation is well known in the prior art. For example, the disc brake assembly 100 may be such as is disclosed by U.S. Pat. No. 8,844,683 to Sternal et al., U.S. Pat. No. 8,051,958 to Rockwell et al., U.S. Pat. No. 6,039,156 to Schneider, U.S. Pat. No. 5,927,446 to Evans, U.S. Patent Application Publication No. 2017/0261053 to Schaefer et al., or U.S. Patent Publication No. 2018/0087589 to Gerber et al, the disclosures of all of which are hereby incorporated by reference in entirety herein. Furthermore, the sliding mechanism 102 may be used in connection with other types of pin guided or pin sliding disc brake assemblies if so desired.

The disc brake assembly 100 includes a sliding brake caliper 104 and guide pins, indicated generally at 106. Each of the guide pins 106 extends in a longitudinal direction 108 and has a head portion 110 and a shank portion 112 (shown in FIG. 2). Generally, the head portion 110 has a greater diameter than the shank portion 112. The shank portion 112 has an axis extending in the longitudinal direction 108. The guide pins 106 are secured to the brake caliper 104 by mounting bolts 114. Specifically, each of the mounting bolts 114 extends through openings provided in lugs or ears 116 of the brake caliper 104 and are installed in an internally threaded bore of the corresponding head portion 110.

An anchor bracket 118 has non-threaded bores 120 (shown by hidden lines) in arms 122 of the anchor bracket 118. The bores 120 correspond to the guide pins 106 and also each have an axis extending in the longitudinal direction 108. The anchor bracket 118 is secured to a stationary component of the vehicle. As non-limiting examples, the anchor bracket 118 may be secured to a steering knuckle or axle flange of the vehicle. When the disc brake assembly 100 is assembled, the shank portions 112 of the guide pins 106 extend into the bores 120. Alternatively, the guide pins 106 and anchor bracket 118 may be other than as illustrated. As a non-limiting example, the head portion 110 would not have the internally threaded bore if stud type guide pins were used.

As a result, the brake caliper 104 is slidably supported—i.e., floats—on the anchor bracket 118. Preferably, when the brake caliper 104 is supported on the anchor bracket 118 by the guide pins 106, there is substantially no relative radial movement between the guide pins 106 and the bores 120 about the longitudinal direction 108 during operation of the disc brake assembly 100. Instead, there is only linear movement of the guide pins 106 and/or the sliding mechanism 102 in the bores 120 during operation of the disc brake assembly 100. The linear movement of the guide pins 106 and/or the sliding mechanism 102 is in the longitudinal direction 108.

Provided in the brake caliper 104 are outboard and inboard brake shoes 124 and 126, respectively. The brake caliper 104 bears on the outboard brake shoe 124 and brake pistons 128 bear on the inboard brake shoe 126. The brake caliper 104 may have more or fewer than the two brake pistons 128 illustrated. The outboard and inboard brake shoes 124 and 126, respectively, face towards each other and, in a release position, are disposed with a small air clearance on both sides of a brake disc (not shown), such that no significant residual drag moments occur on the brake disc. The brake pistons 128 are mounted in a movable manner in a cavity in the brake caliper 104.

When service braking is desired for a vehicle having the disc brake assembly 100, the disc brake assembly 100 is hydraulically actuated. For example, the disc brake assembly 100 may be hydraulically actuated by a driver via a brake pedal or via a drive assistance system. When the disc brake assembly 100 is hydraulically actuated, hydraulic fluid is pressurized (by a suitable means known to those skilled in the art) in the cavity such that the brake pistons 128 are displaced from a non-braking position and along the longitudinal direction 108 towards the inboard brake shoe 126. As a consequence, and as is known to those skilled in the art, the inboard brake shoe 126 is pressed onto the brake disc by the brake pistons 128 and, at the same time, a corresponding displacement of the brake caliper 104 on an opposite side of the brake disc causes the outboard brake shoe 124 to be drawn against the opposite side of the brake disc. With the outboard and inboard brake shoes 124 and 126, respectively, pressed against the disc brake, the disc brake assembly 100 is in a braking position. The braking torque slows or stops rotation of the associated wheel of the vehicle.

Figure 3:
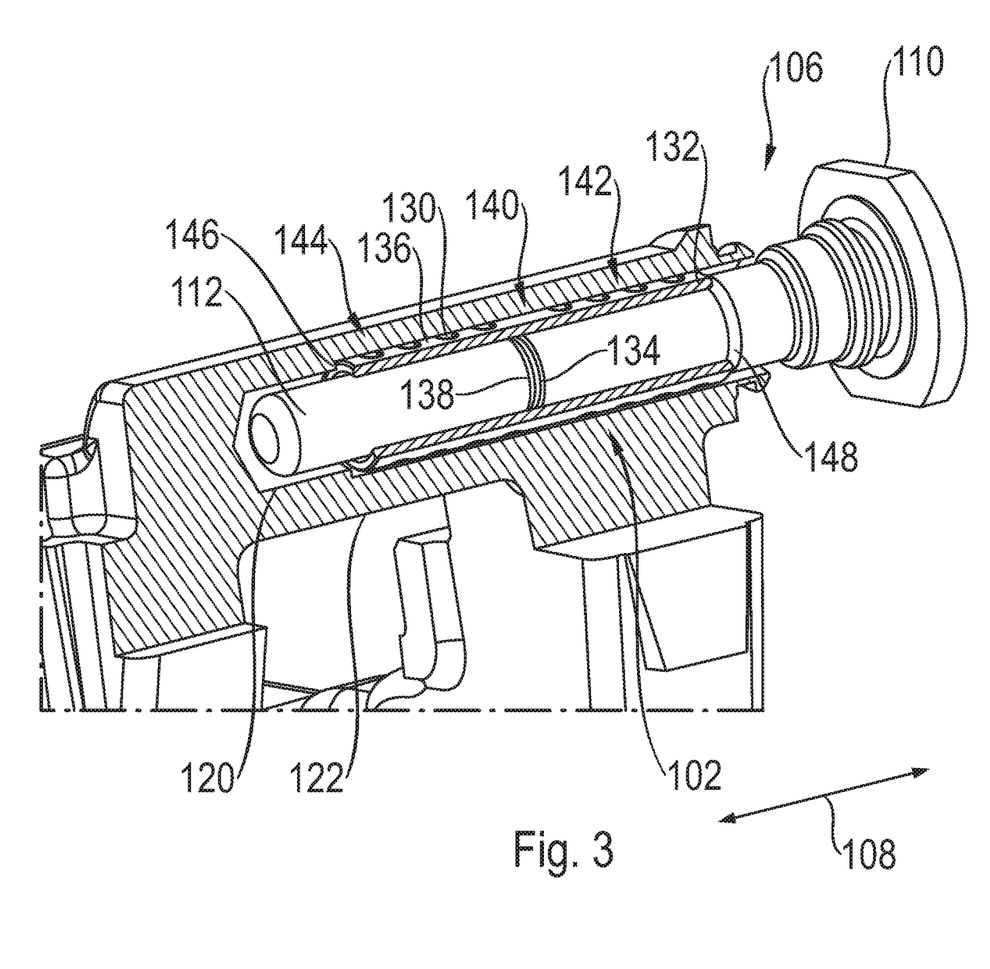
FIG. 3 is a partial section view taken along line 3-3 of FIG. 1.
Figure 4:
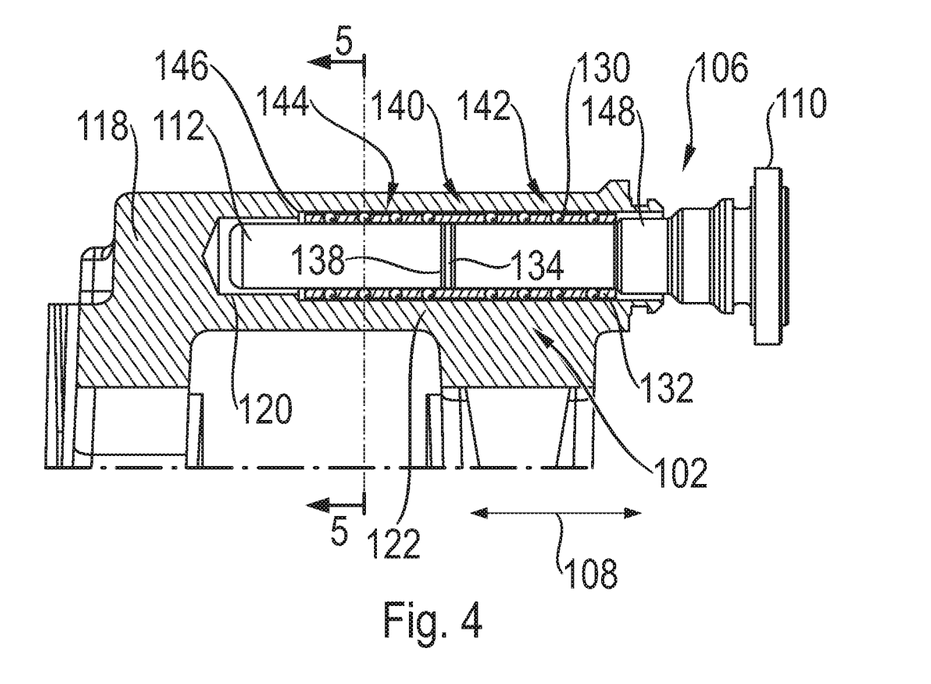
FIG. 4 is a partial section view taken along line 4-4 of FIG. 1.

Referring now to FIGS. 2-4, the sliding mechanism 102 is illustrated in detail. Preferably, the sliding mechanism 102 is provided for each of the guide pins 106. Alternatively, the sliding mechanism 102 may be provided for only one of the guide pins 106 or differently tuned sliding mechanisms may be provided for each of the guide pins 106—i.e., each of the sliding mechanisms 102 for a given disc brake assembly 100 need not be the same. Although the sliding mechanism 102 will be discussed singularly in relation to one of the guide pins 106, the discussion also applies to the other of the guide pins 106.

The sliding mechanism 102 includes bearing members 130, a tubular sleeve 132, and a damping member 134. As non-limiting examples, the tubular sleeve 132 may be fabricated from a suitable metallic material such as brass or a suitable plastic material. As a non-limiting example, the bearing members 130 may be fabricated from a suitable metallic material such as steel or a suitable plastic material.

The bearing members 130 are in contact with both the anchor bracket 118 and the guide pin 106. The tubular sleeve 132 has pockets 136 corresponding to each of the bearing members 130 and in which the bearing members 130 are positioned. As a non-limiting example, the bearing members 130 may be ball bearings. As a further non-limiting example, the bearing members 130 may be retained in the pockets 136 by peening. As shown in FIG. 2, peening may result in more of the bearing members 130 being visible or otherwise exposed from outside of the tubular sleeve 132 compared to from inside the tubular sleeve 132. Alternatively, the bearing members 130 may be held loose in the pockets 136—e.g., the bearing members 130 may be held in the pockets 136 by the guide pin 106 and the surface of the bore 120. Alternatively, the tubular sleeve 132 may be omitted and the bearing members provided in pockets in a surface of the guide pin 106 or the bore 120.

As illustrated, the tubular sleeve 132 positions the bearing members 130 in a repeating square grid pattern. Alternatively, the bearing members 130 may be positioned in other than the square grid pattern. As non-limiting examples, the bearing members 130 may be arranged in a diamond pattern or spiral pattern. Alternatively, as a further non-limiting example, the bearing members 130 may be arranged in a non-repeating pattern or otherwise varying arrangement. The bearing members 130 may be positioned by the tubular sleeve 132 in any pattern to support the sliding mechanism 102 in the bore 120 and the guide pin 106 on the sliding mechanism 102.

The guide pin 106 moves, slides, or otherwise experiences sliding motion in the longitudinal direction 108 on the bearing members 130 relative to the sliding mechanism 102. Similarly, the sliding mechanism 102 moves, slides, or otherwise experiences sliding motion in the longitudinal direction 108 on the bearing members 130 relative to the bore 120 and the anchor bracket 118. Alternatively, only one of the guide pin 106 or the sliding mechanism 102 may experience sliding motion in the longitudinal direction 108. Specifically, the guide pin 106 rolls on the bearing members 130 as the guide pin 106 moves and the bearing members 130 in turn roll on the surface of the bore 120 when the sliding mechanism 102 moves. As discussed, the brake caliper 104 is slidably supported on the anchor bracket 118 because the guide pins 106 are supported in the bores 120. More specifically, the shank portion 112 of the guide pin 106 is supported by the bearing members 130 in the bore 120.

The damping member 134 damps relative movement between the sliding mechanism 102 and the guide pin 106. The damping member 134 is in contact with both the sliding mechanism 102 and the guide pin 106. The damping member 134 is positioned or otherwise installed in a circumferential recess 138 in the shank portion 112 of the guide pin 106. The recess 138 extends in a circumferential direction around the shank portion 112. The recess 138 is transverse to the longitudinal direction 108. Preferably, the recess 138 is perpendicular to the longitudinal direction 108. The recess 138 corresponds in shape to the damping member 134 to seat the damping member 134 in the recess 138.

As illustrated, the damping member 134 is an annular O-ring. Alternatively, the damping member 134 may be other than an O-ring. As a non-limiting example, the damping member 134 may have a rectilinear, polygonal, or oval cross section. As a further non-limiting example, the damping member 134 may be non-continuous or otherwise have gaps in the circumferential direction—i.e., the damping member 134 may comprise a plurality of individual damping members in lieu of a single member as illustrated. As illustrated, the recess 138 is at a midpoint of the guide pin 106 in the longitudinal direction 108. Alternatively, the recess 138 may be at other than the midpoint of the guide pin 106.

The damping member 134 is preferably manufactured from an elastomer material such as rubber. Alternatively, the damping member 134 may be manufactured from other than an elastomer material. As a non-limiting example, the damping member 134 may be manufactured from a plastic material. The damping member 134 is preferably sized to develop sufficient friction with the tubular sleeve 132 to retain the guide pin 106 in the tubular sleeve 132.

The bearing members 130 are spaced in the tubular sleeve 132 such that the bearing members 130 do not contact the damping member 134. The tubular sleeve 132 has a middle portion, indicated generally at 140, between first and second bearing members, indicated generally at 142 and 144, respectively. The damping member 134 contacts the tubular sleeve 132 within the middle portion 140 between the first and second bearing members 142 and 144, respectively. As such, the bearing members 130 do not contact the damping member 134. Alternatively, the middle portion 140 may be omitted.

A circumferential bore step 146 is provided in the bore 120. The bore step 146 limits movement of the sliding mechanism 102 in the longitudinal direction 108 into the bore 120. A circumferential guide pin step 148 is provided in the guide pin 106. The guide pin step 148 limits movement of the guide pin 106 in the longitudinal direction 108 into the sliding mechanism 102. When the guide pin 106 is restrained, the guide pin step 148 also limits movement of tubular sleeve 132 in the longitudinal direction 108 out of the bore 120. Together, the bore step 146 and the guide pin step 148 space and position the guide pin 106, and sliding mechanism 102, in the bore 120. Alternatively, the bore step 146 may be omitted and the guide pin 106 sized such that the sliding mechanism 102 and the guide pin 106 may be used as an assembly with existing caliper assemblies without modification to the existing caliper assemblies.

As illustrated, the circumferential bore and guide pin steps 146 and 148, respectively, are perpendicular to the longitudinal direction 108. Alternatively, the circumferential bore and guide pin steps 146 and 148, respectively, may be other than perpendicular to the longitudinal direction 108. As a non-limiting example, one or both of the circumferential bore and/or guide pin steps 146 and/or 148, respectively, may be transverse to the longitudinal direction 108. Furthermore, as illustrated, the circumferential bore and guide pin steps 146 and 148, respectively, are each in a plane. Alternatively, one or both of the circumferential bore and/or guide pin steps 146 and/or 148, respectively, may be other than in a plane. As a non-limiting example, one or both of the circumferential bore and/or guide pin steps 146 and/or 148, respectively, may extend in a "stepped" or "jig-saw" shape in the longitudinal direction 108.

Figure 5:
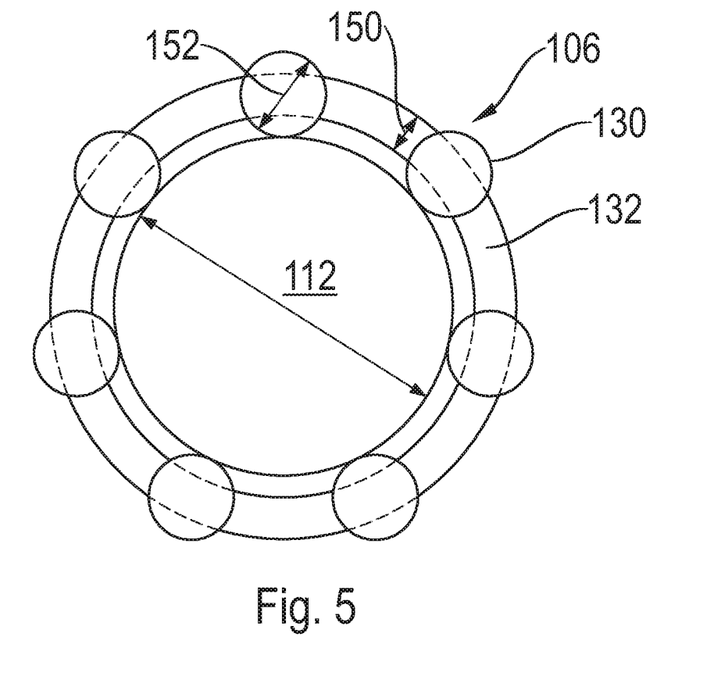
FIG. 5 is a partial section view taken along line 5-5 of FIG. 4.

Referring to FIG. 5, there is illustrated a cross section of the sliding mechanism 102. The tubular sleeve 132 has a sleeve thickness 150 and the bearing members 130 have a bearing member diameter 152. The bearing member diameter 152 is greater than the sleeve thickness 150. As a non-limiting example, the bearing member diameter 152 may be twice the sleeve thickness 150. As a further non-limiting example, the bearing member diameter 152 may be 2 mm and the sleeve thickness 150 may be 1 mm.

Figure 6:
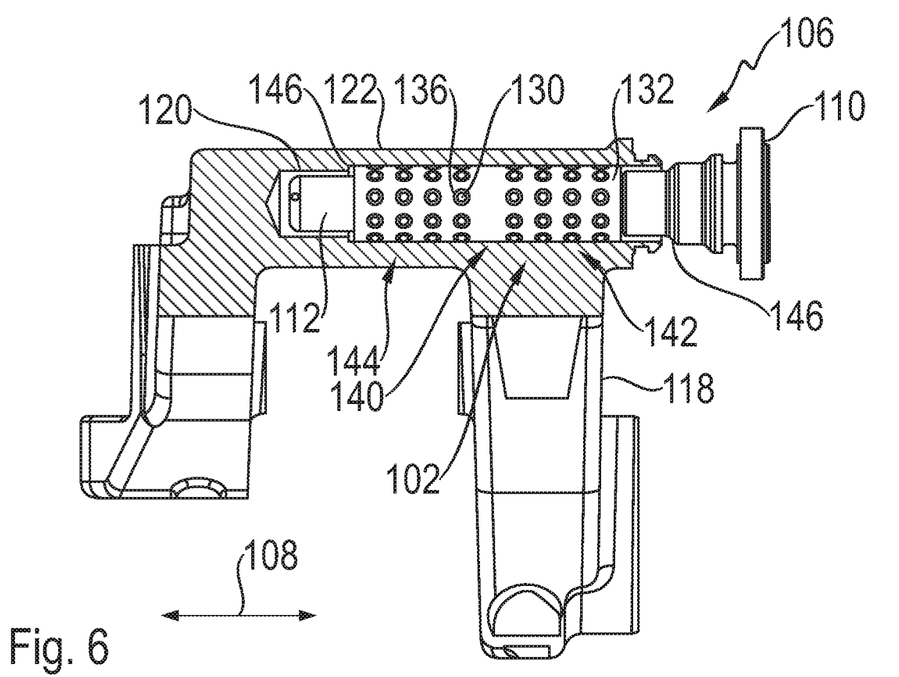
FIG. 6 is a partial section view of the disc brake assembly of FIG. 1 showing the sliding mechanism in a first position.
Figure 7:
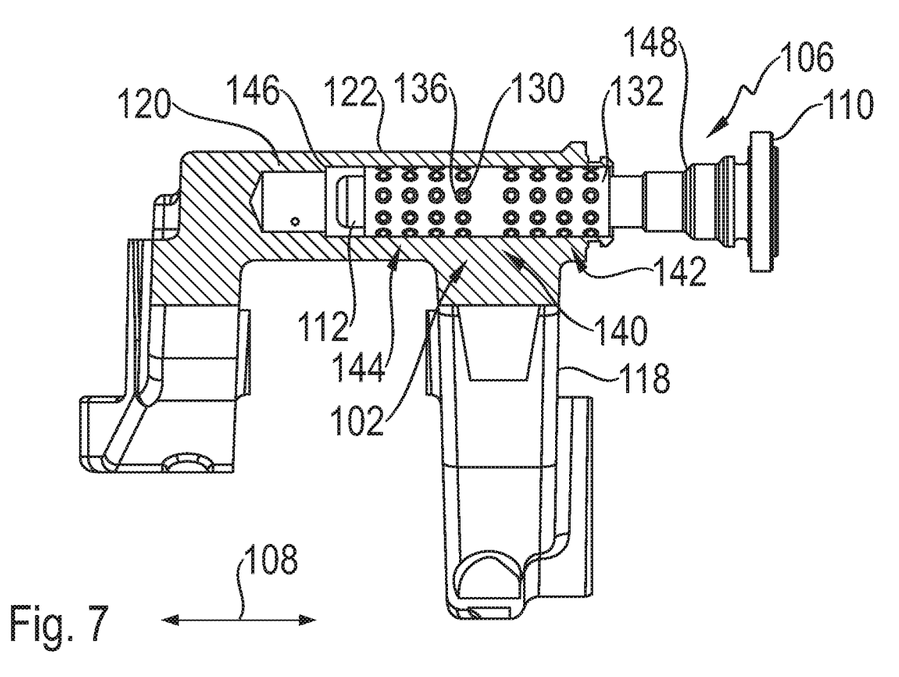
FIG. 7 is a partial section view of the disc brake assembly of FIG. 1 showing the sliding mechanism in a second position.

Referring to FIG. 6, there is illustrated the disc brake assembly 100 with the sliding mechanism 102 in a first or retracted position. In the retracted position, a first end face of the sliding mechanism 102 is in contact with the bore step 146 and the guide pin step 148 is in contact with a second end face of the sliding mechanism 102. The retracted position typically occurs when the outboard and inboard brake shoes 124 and 126, respectively, are new or otherwise unworn. Referring now to FIG. 7, there is illustrated the disc brake assembly 100 with the sliding mechanism in a second or extended position. The extended position typically occurs when the outboard and inboard brake shoes 124 and 126, respectively, are worn.

In FIG. 7, the guide pin 106 has moved twice as far as the sliding mechanism 102 out of the bore 120. As a non-limiting example, the guide pin 106 may move 14 mm out of the bore 120 and the sliding mechanism 102 may move 7 mm out of the bore 120. This is because the guide pin 106 and the tubular sleeve 132 of the sliding mechanism 102 move at different velocities. Specifically, the guide pin 106 moves at a velocity twice that of a velocity at which the tubular sleeve 132 moves.

The damping member 134 damps or otherwise impedes movement of the guide pin 106 relative to the sliding mechanism 102. A level or amount of damping provided by the damping member 134 is tunable or otherwise adjustable. As a non-limiting example, the level of damping provided by the damping member 134 may be adjusted by changing a cross sectional diameter of the damping member 134. Increasing the cross sectional diameter will increase the level of damping and decreasing the cross sectional diameter will decrease the level of damping.

Figure 8:
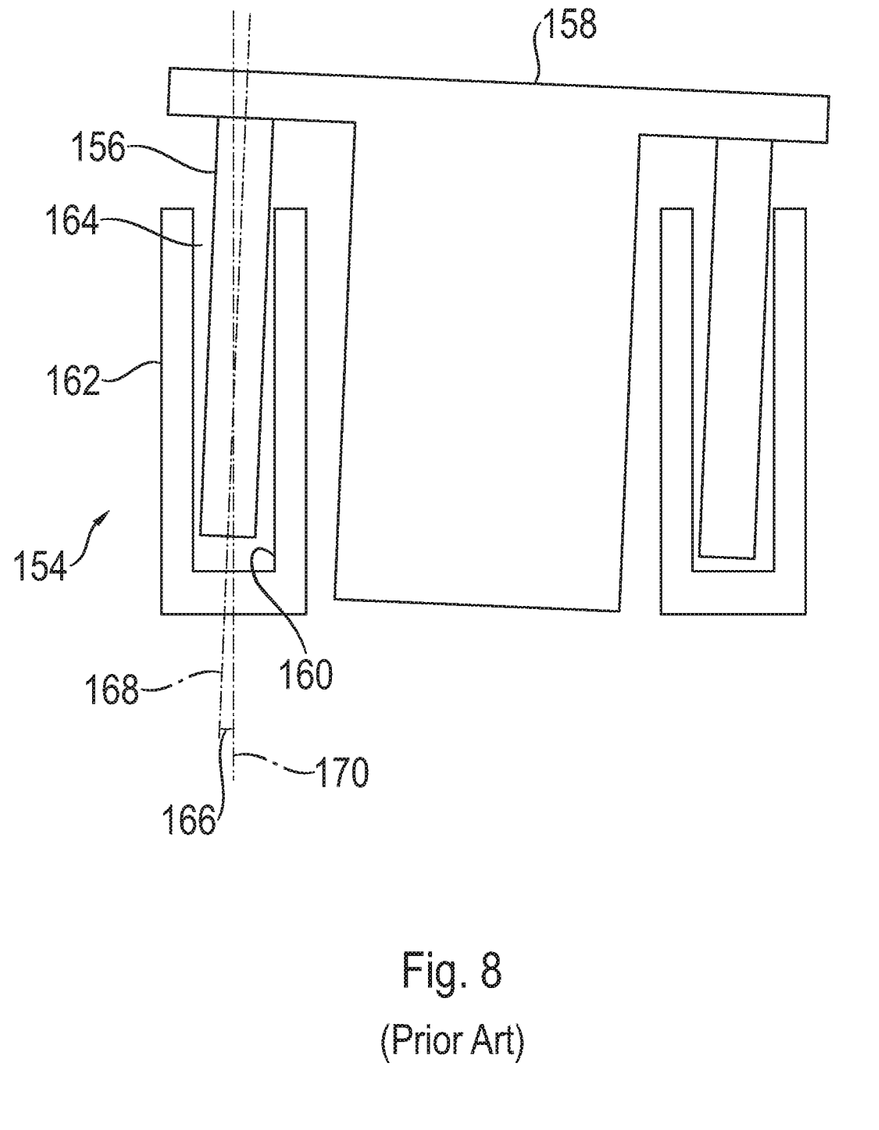
FIG. 8 is a schematic section view of a prior art disc brake assembly.

Referring now to FIG. 8, there is illustrated a prior art disc brake assembly, indicated generally at 154, and having guide pins 156 extending from a brake caliper 158 and into bores 160 of an anchor bracket 162. The prior art disc brake assembly 154 does not have a sliding mechanism. Without the sliding mechanism, there is a large clearance 164 between the guide pins 156 and the bores 160. As a result of the large clearance 164, the guide pins 156 may become misaligned in the bores 160 through normal operation of the disc brake assembly 154. For example, there is an offset angle 166 between a pin axis 168 of the guide pins 156 and a bore axis 170 of the bores 160.

Figure 9:
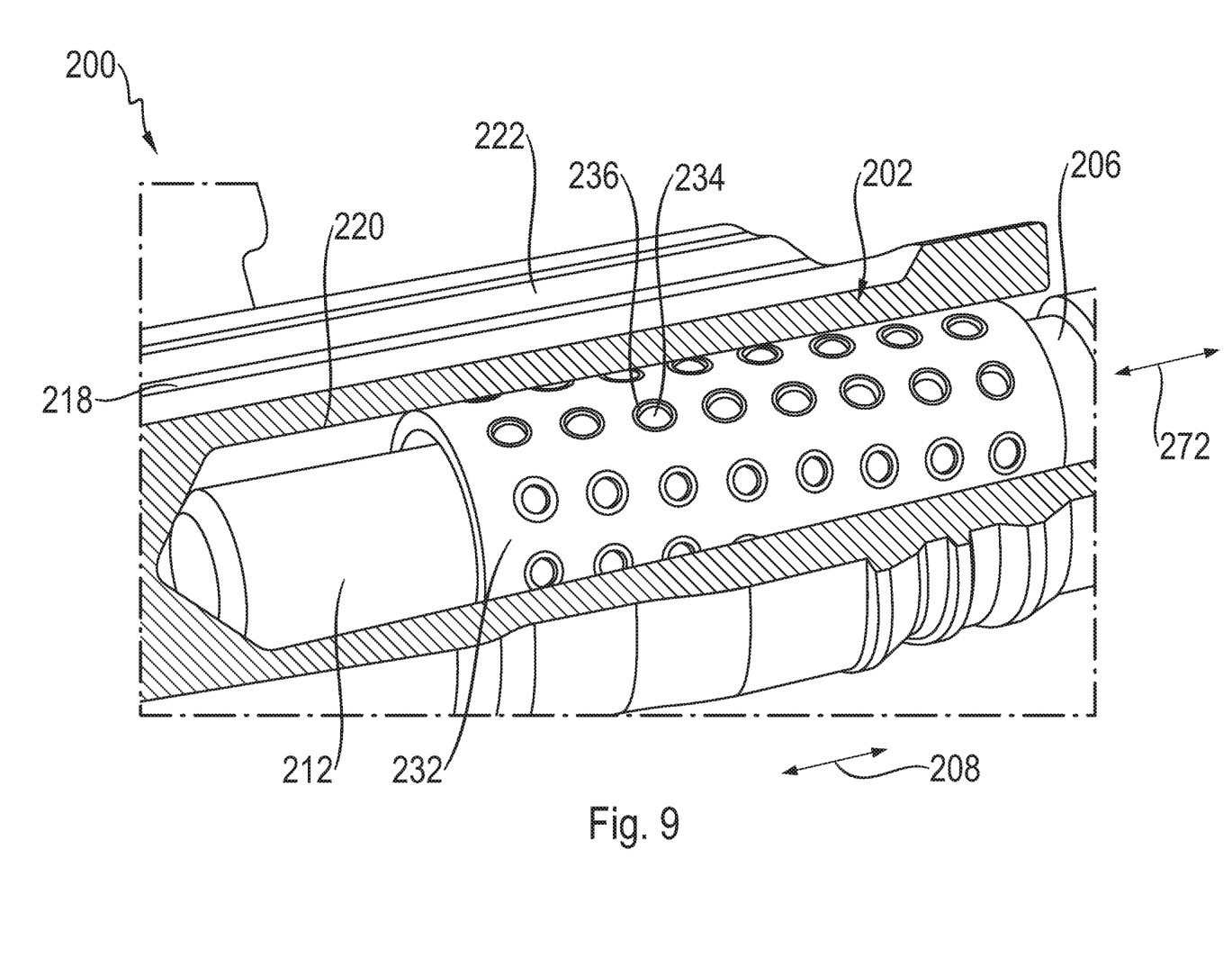
FIG. 9 is a cutaway perspective view of a sliding mechanism in accordance with a second embodiment of the present invention.

Referring now to FIG. 9, there is illustrated a sliding mechanism, indicated generally at 202, that is in accordance with a second embodiment of the present invention. The sliding mechanism 202 is a variation of the sliding mechanism 102 described with reference to FIGS. 1-7. As such, like reference numerals, increased by 100, designate corresponding parts in the drawings and detailed description thereof will be omitted, unless otherwise noted.

The sliding mechanism 202 has bearing members 234 positioned by a tubular sleeve 232 in a spiral or corkscrew pattern. The spiral pattern is around an axis 272 along which a guide pin 206 extends. The spiral pattern increases structural durability of the sliding mechanism 202.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A disc brake assembly comprising:
   an anchor bracket having at least one bore formed therein;
   a guide pin adapted to be disposed in the at least one bore and slidably support a brake caliper relative to the anchor bracket;
   a sliding mechanism adapted to slidably support the guide pin in the at least one bore, the sliding mechanism including bearing members disposed in the at least one bore between the anchor bracket and the guide pin, during use of the disc brake assembly, the bearing members being movable in a longitudinal direction relative to the anchor bracket, the sliding mechanism being movable in the longitudinal direction on the bearing members relative to the bore and the anchor bracket, and the guide pin being movable in the longitudinal direction on the bearing members relative to the sliding mechanism, the bearing members being ball bearings, the sliding mechanism including a tubular sleeve carrying the ball bearings, the tubular sleeve having a first sleeve portion carrying a first portion of the ball bearings, a second sleeve portion carrying a second portion of the ball bearings and a third sleeve portion extending longitudinally between the first and second sleeve portions, the third sleeve portion being free of ball bearings; and
   a damping member directly radially between the guide pin and the third sleeve portion and spaced from each of the ball bearings, the damping member damping sliding motion of the guide pin relative to both the anchor bracket and the sliding mechanism.

2. The disc brake assembly of claim 1 wherein the damping member is an elastomer material.

3. The disc brake assembly of claim 1 wherein the guide pin has a circumferential recess and the damping member is an elastomer O-ring in the recess.

4. The disc brake assembly of claim 1 wherein the damping member is adapted to retain the guide pin in the sliding mechanism.

5. The disc brake assembly of claim 1 wherein both the guide pin and the sliding mechanism are adapted to allow the sliding motion.

6. The disc brake assembly of claim 1 further comprising:
   a step in the at least one bore, wherein the step limits sliding motion of the sliding mechanism.

7. The disc brake assembly of claim 1 further comprising:
   a step in the guide pin, wherein the step limits sliding motion of the sliding mechanism.

8. The disc brake assembly of claim 1 wherein the tubular sleeve and carried bearing members are movable as a single unit in the longitudinal direction relative to the anchor bracket.

9. The disc brake assembly of claim 1 wherein the bearing members are provided in pockets of the tubular sleeve.

10. The disc brake assembly of claim 1 wherein the bearing members are provided in pockets of the tubular sleeve and held therein by the guide pin.

11. The disc brake assembly of claim 1 wherein the disc brake assembly includes a plurality of bores in the anchor bracket, a plurality of guide pins, a plurality of sliding mechanisms and a plurality of damping members.

12. A disc brake assembly comprising:
   an anchor bracket having a bore formed therein;
   a guide pin disposed in the bore and slidably supporting a brake caliper relative to the anchor bracket;
   a sliding mechanism disposed between the bore and the guide pin, wherein the sliding mechanism is slidably supporting the guide pin in the bore, the sliding mechanism including bearing members disposed in the bore between the anchor bracket and the guide pin, the bearing members being movable in a longitudinal direction relative to the anchor bracket during use of the disc brake assembly, the sliding mechanism being movable in the longitudinal direction on the bearing members relative to the bore and the anchor bracket and the guide pin being movable in the longitudinal direction on the bearing members relative to the sliding mechanism, the bearing members being ball bearings, the sliding mechanism including a tubular sleeve carrying the ball bearings, the tubular sleeve having a first sleeve portion carrying a first portion of the ball bearings, a second sleeve portion carrying a second portion of the ball bearings and a third sleeve portion extending longitudinally between the first and second sleeve portions, the third sleeve portion being free of ball bearings; and
   an elastomer O-ring in a recess of the guide pin and directly radially between the guide pin and the third sleeve portion, the elastomer O-ring being spaced from each of the ball bearings, wherein the O-ring retains the guide pin in the sliding mechanism and damps sliding motion of the guide pin relative to the sliding mechanism.

13. The disc brake assembly of claim 12 wherein the O-ring damps sliding motion of the guide pin relative to the anchor bracket.

14. The disc brake assembly of claim 12 wherein, the tubular sleeve and the bearing members being movable as a single unit in the longitudinal direction relative to the anchor bracket.

15. The disc brake assembly of claim 14 wherein the bearing members are provided in pockets of the tubular sleeve.

16. The disc brake assembly of claim 12 wherein the bearing members are provided in pockets of the tubular sleeve and held therein by the guide pin.

* * * * *